United States Patent [19]
Viano et al.

[11] Patent Number: 5,258,740
[45] Date of Patent: Nov. 2, 1993

[54] VEHICLE ACTION LIGHTING

[75] Inventors: David C. Viano, Bloomfield Hills; Joseph D. McCleary, Mt. Clemens; Edward A. Jedrzejczak, Brown City, all of Mich.

[73] Assignee: General Motors Corporation, Detroit, Mich.

[21] Appl. No.: 936,719

[22] Filed: Aug. 31, 1992

Related U.S. Application Data

[63] Continuation-in-part of Ser. No. 873,134, Apr. 24, 1992, abandoned.

[51] Int. Cl.$^5$ .............. B60Q 1/50; B60Q 1/00
[52] U.S. Cl. .................. 340/467; 340/464; 340/463; 340/456; 340/479; 340/478
[58] Field of Search ........... 340/467, 464, 463, 456, 340/479, 478

[56] References Cited

U.S. PATENT DOCUMENTS

| | | | |
|---|---|---|---|
| 1,880,849 | 10/1932 | Damico | 340/464 |
| 1,895,260 | 1/1933 | Treese | 340/464 |
| 2,005,483 | 6/1935 | Sucky et al. | 340/464 |
| 2,463,088 | 3/1949 | Coombs | 340/464 |
| 2,553,462 | 5/1951 | Mann | 200/59 |
| 3,110,012 | 11/1963 | Manning | 340/74 |
| 3,444,514 | 5/1969 | Yang | 340/66 |
| 3,500,313 | 3/1970 | Nolte, Jr. | 340/467 |
| 4,491,824 | 1/1985 | Chiou | 340/66 |
| 4,812,807 | 3/1989 | Savis et al. | 340/464 |
| 4,940,962 | 7/1990 | Sarokin | 340/479 |

FOREIGN PATENT DOCUMENTS 1430674  4/1965  France .

*Primary Examiner*—Donnie L. Crosland
*Attorney, Agent, or Firm*—Howard N. Conkey

[57] ABSTRACT

An externally visible indication of incipient automotive vehicle motion is displayed based on information from the vehicle operator, the engine and the transmission, as interpreted by the vehicle controller, wherein acceleration information is selectively provided during throttle tip-in while the transmission is in a low gear, and wherein brake information is provided when the brake pedal is depressed. Unique external displays of the incipient motion, sensitive to ambient light levels, are provided in forward areas of the vehicle.

4 Claims, 3 Drawing Sheets

VEHICLE ACTION LIGHTING

This is a continuation-in-part of application Ser. No. 07/873134 filed on Apr. 24, 1992 now abandoned.

FIELD OF THE INVENTION

This invention relates to external lighting systems for automotive vehicles and especially for external lighting indicative of prospective changes in vehicle motion.

BACKGROUND OF THE INVENTION

The advantage of external display of acceleration and brake information on automotive vehicles, although apparent in a variety of driving situations, is perhaps most strongly felt at traffic intersections, where automotive vehicles and pedestrians interact from a plurality of directions and at a variety of speeds. Conventional vehicle external lighting provides such information in areas that may not be visible in all situations at intersections.

Prior art systems that do make provision for such situations provide lights that either are not sufficiently conspicuous to attract attention in the often busy intersections, or that illuminate when not needed. Lighting circuits, such as is described by Davis et al. in U.S. Pat. No. 4,812,807, entitled "Vehicle Motion Indicator", issued Mar. 14, 1989, have been proposed that indicate a depression of a vehicle acceleration or brake pedal from a hardwired pedal switch connected directly to a simple indicator lamp. Such a circuit requires extended periods of illumination of the lighting, due to the inflexibility of the circuitry.

The effectiveness of any exterior lighting system is dependent on its specificity and its conspicuity to other drivers, which may be improved by selective application of unusual lighting in key areas of the vehicle. Accordingly, what is desired is a selective external display of brake and accelerator information in forward areas of the vehicle, conspicuous to those interacting with the vehicle, especially at traffic intersections.

SUMMARY OF THE INVENTION

The present invention provides a supplementary lighting system for automotive vehicles that is highly conspicuous to those in front of or on the sides of the vehicle, and provides an early indication of driver action and subsequent vehicle motion. This invention accounts for the uncertainty associated with a stopped automotive vehicle, for instance at an intersection. Highly visible information on the intentions of the driver of the vehicle will aid others in the intersection in their decision on how to proceed through the intersection, contributing to improved vehicle interaction at intersections and to improved traffic efficiency.

Accordingly, this invention provides unique forward and side mounted lighting, driven by a vehicle controller, which indicates prospective vehicle braking, such as from brake pedal depression, and prospective vehicle acceleration, which is predicted using accelerator and transmission information from the vehicle controller. Transmission information is also used in a decision to extinguish the acceleration lights when the vehicle is operating in a gear associated with substantial vehicle speed, such as second gear. The lights will thus only be on for a short period after acceleration has begun, when they are needed to indicate the initial stages of vehicle motion.

Lights such as these that are selectively illuminated will likely draw more attention when illuminated and consume less power overall than those left on for long periods of time, such as daytime running lamps or the above described U.S. Pat. No. 4,812,807. The lights are provided in unusual displays, such as a series of lights that wrap around the front corners of the vehicle and are alternately illuminated. As such, even when such lighting is provided in areas of a vehicle replete with more conventional lighting, conspicuity of the new lighting in accord with this invention is preserved. Furthermore, the intensity of the lights are adjusted to accommodate changing levels of ambient light, to provide noticeable daytime lighting without excessive glare at night. Beyond indicating prospective acceleration, the acceleration lights may be illuminated in a more conventional manner to improve vehicle conspicuity generally. For example, the entire series of acceleration lights may be steadily illuminated while the vehicle is operating, until and after such time as they are needed to indicate prospective vehicle acceleration.

DESCRIPTION OF THE DRAWINGS

The invention may be best understood by reference to the following description of a preferred embodiment and to the drawings in which.

DESCRIPTION OF A PREFERRED EMBODIMENT

Figure 1:
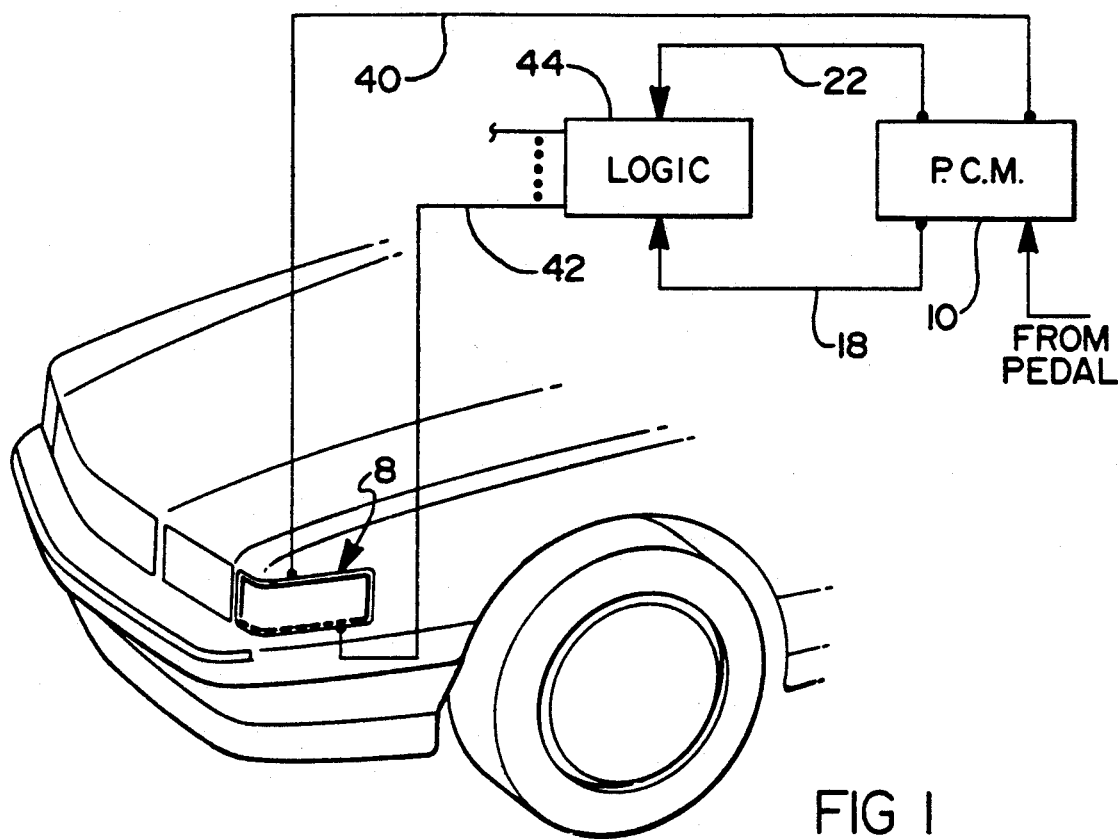
FIG. 1 illustrates the location of the vehicle action lighting in accord with this invention on an automotive vehicle and general control circuitry.

Referring to FIG. 1, the forward portion of an automotive vehicle is shown, having a well-known front lighting system, including a cornering lamp on each front corner of the vehicle. One such cornering lamp 8 is shown in FIG. 1. Each of the two cornering lamps wraps around a front corner of the vehicle so as to provide lighting visible both in front of and on the side of the vehicle. The cornering lamp 8 is further detailed in FIG. 2, and shows, in addition to any conventional lamps or reflectors that may be present therein, a supplemental brake lamp 80, and a series of acceleration lamps 84a through 84h.

In the preferred embodiment, the brake lamp 80 takes on the color of the conventional rear brake lamps or other noticeable colors, such as any of the various shades of green. Additionally, to increase its conspicuity, the lamp 80 extends around the inside perimeter of the cornering lamp, so that a substantial portion of the lamp can be seen from both the front of and the side of the vehicle.

Figure 2:
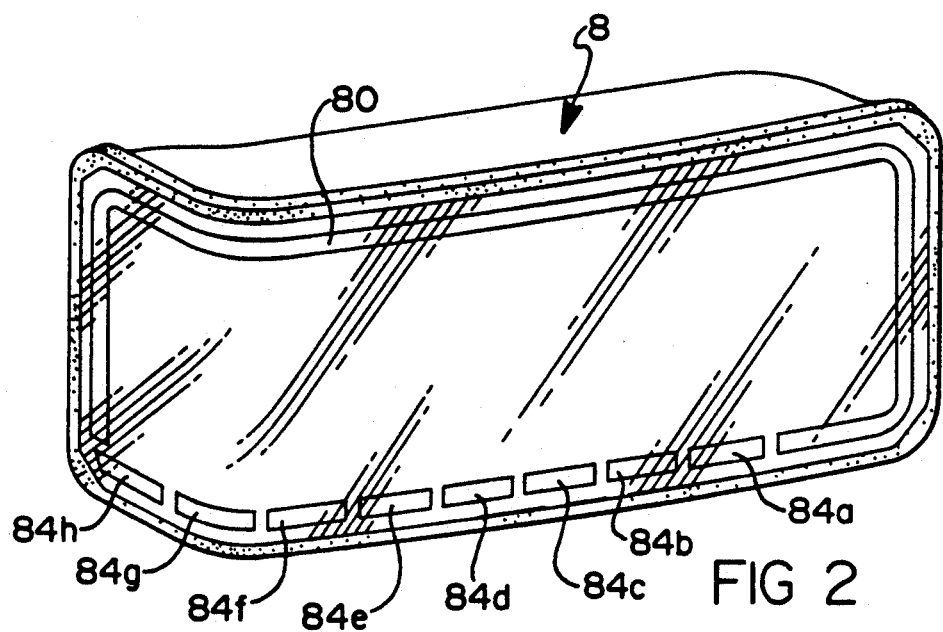
FIG. 2 is a general diagram of the vehicle action lighting of one embodiment of this invention on a vehicle cornering lamp.

The acceleration lights 84a–84h are of high intensity, are substantially white in the preferred embodiment, and are arranged in a sequence of eight lights located side by side along the bottom portion of the cornering lamp 8, so that at least two of the acceleration lights 84g and 84h are plainly visible from the front of the vehicle, and the remaining six lights 84a–84f are plainly visible from the side of the vehicle. The lights may be light emitting diodes LEDs or other means of generating fast, responsive light intensity. As illustrated in FIG. 2, despite the presence of the brake and acceleration lighting, the vast majority of the reasonably sized cornering lamp 8 remains available for more conventional lights or reflectors.

Such is a convenient and inexpensive integration of the lighting system in accord with this invention onto a vehicle with such wraparound cornering lamps. However, the inventors envision that other configurations may be substituted for that of this embodiment without departing from the spirit of this invention, provided the lights are in such a configuration as to provide a highly visible and fast-responding front and side indication of prospective braking and acceleration.

Referring again to FIG. 1, the primary control of the conspicuity lighting in accord with this embodiment is the driver action on the brake pedal or accelerator pedal in an automotive vehicle. Such action is provided to a powertrain control module PCM 10 in a conventional manner, such as by normally open electrical switches that close upon a predetermined amount of depression of the brake and accelerator pedals, communicating a short circuit condition to the PCM. If the PCM 10, based at least in part on the brake pedal input, determines that braking is necessary, the PCM 10 will illuminate two brake lights 78 and 80 (FIG. 4) in each of the front cornering lamps of the vehicle via the brake light drive line 40.

Figure 3:
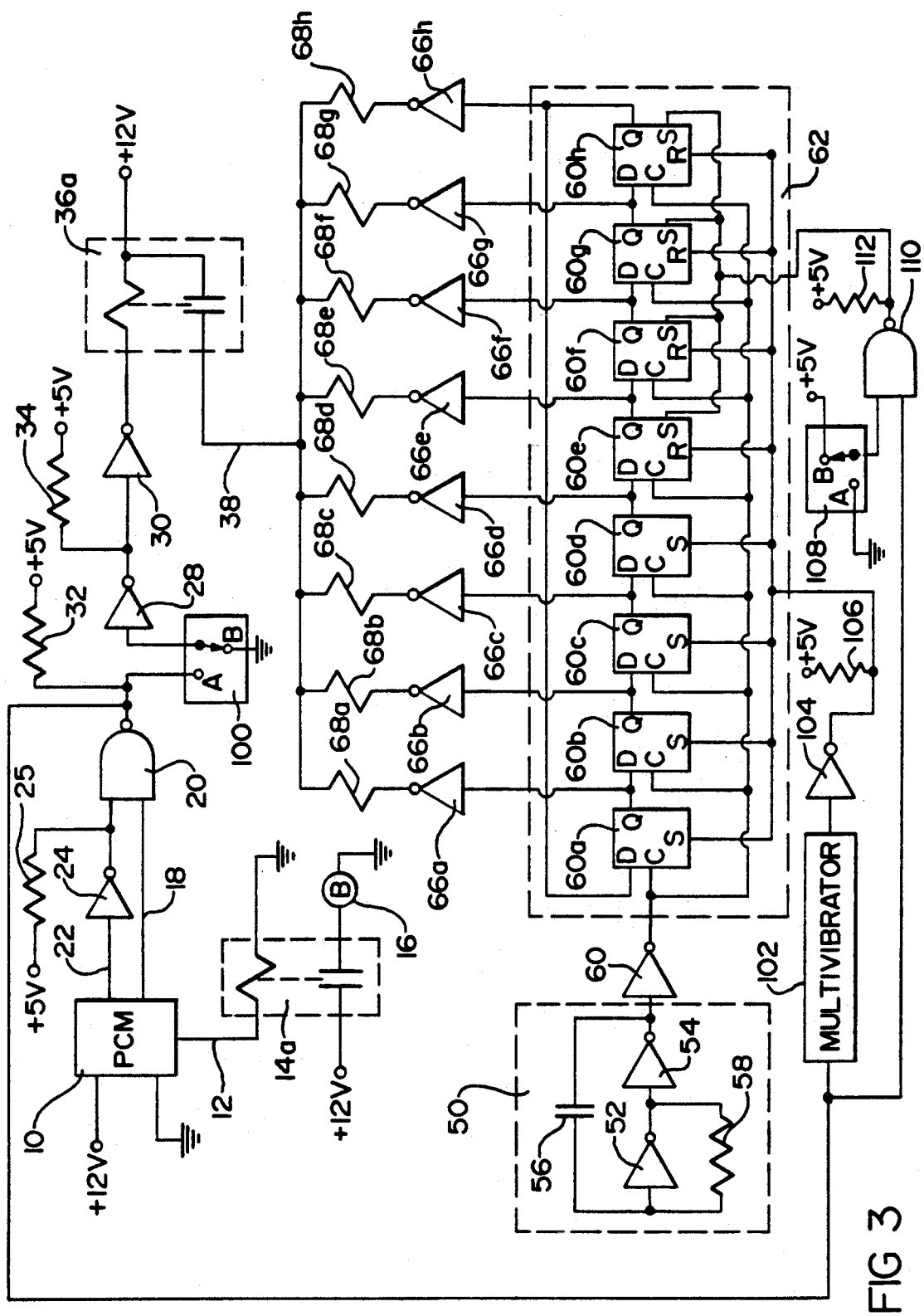
FIGS. 3 and 4 are diagrams of the hardware used to carry out the principles of this invention in accord with a preferred embodiment.

If the vehicle is in first gear, as indicated by line 22, and the PCM 10 sets line 18 high, such as when the driver depresses the accelerator pedal, the acceleration light sequencing logic 44 will illuminate the acceleration lights, 84a-84h in FIG. 2, resident in the cornering lamp 8 in an alternating manner, via eight drive lines symbolized in FIG. 3 as line 42. The combination of the signals on lines 18 and 22 provide an early indication of eventual changes in vehicle speed and, in this embodiment, have been found to precede the actual change in motion by approximately 0.3 to 0.5 seconds. When not sequencing the acceleration lights, for example those lights 84a-84h in FIG. 2, the logic 44 may steadily illuminate all of the acceleration lights while the vehicle is operating for improved vehicle conspicuity.

Figure 4:
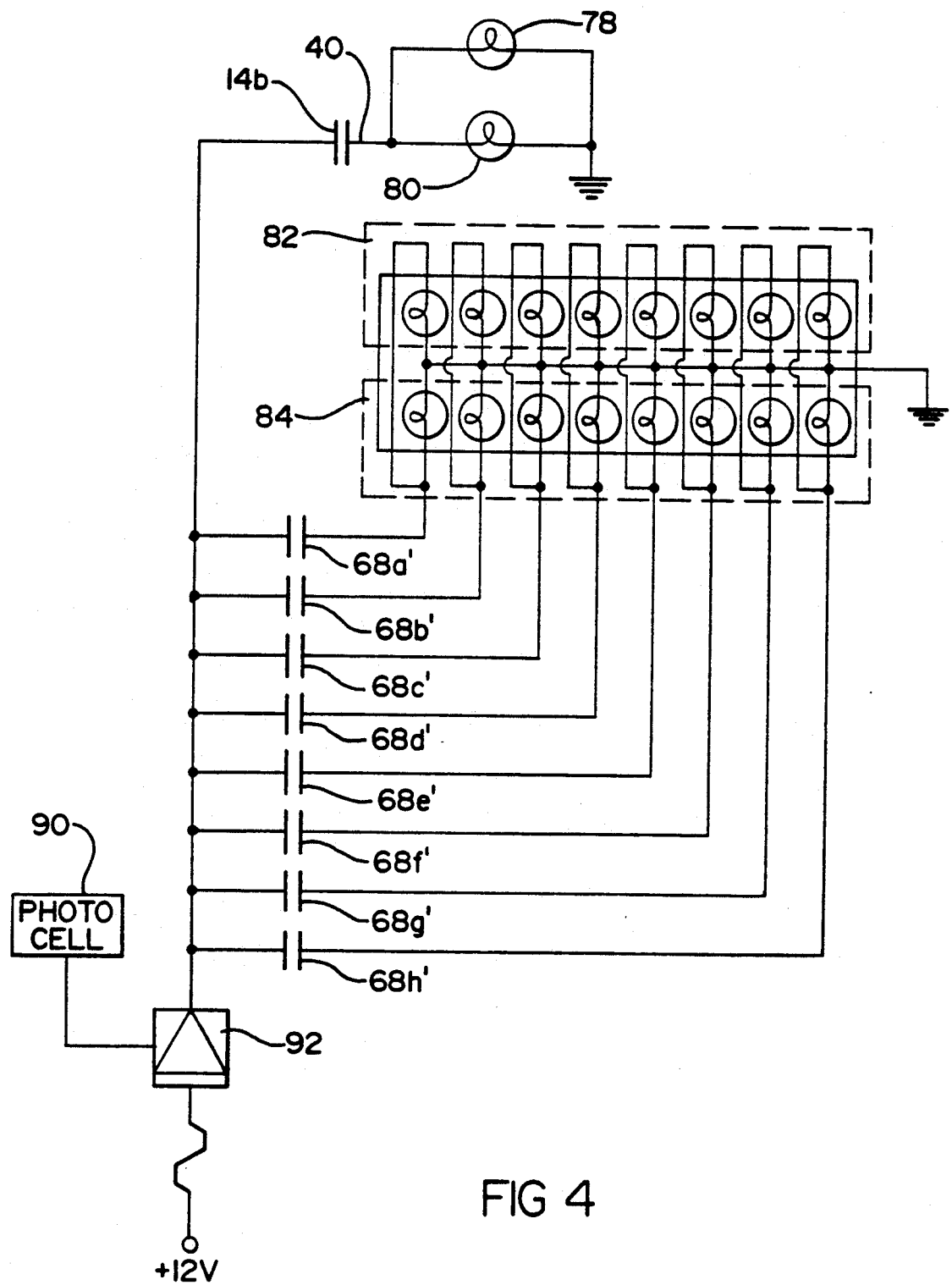

The specific manner in which the vehicle forward lighting of this embodiment is controlled is described in FIGS. 3 and 4. The PCM 10 receives several inputs (not shown) on the present state of the vehicle, for example, from the engine, transmission and vehicle operator. While the vehicle is braking, the PCM 10 sets output line 12 high, closing the conventional relay 14a, directly connecting a voltage source, such as a twelve volt source, to well-known rear brake lights 16. The switch 14b of FIG. 4 is also closed by relay 14a, connecting a power source 92, to be discussed, to supplemental brake lights 78 and 80 located in this embodiment on forward left and right cornering lamps. The front brake lights 78 and 80 and the conventional rear brake lights 16 remain on in this manner until the brakes applied signal on line 12 goes low, such as when the vehicle is no longer braking.

Aside from braking information, the PCM 10 provides transmission and accelerator pedal information to the circuit illustrated in FIGS. 3 and 4. Specifically, line 22 from PCM 10 is low when the transmission (not shown) is in first gear, and goes high when the transmission shifts to a higher gear, such as second gear. This transition from first to a higher gear, indicates that the vehicle is moving forward with significant speed, to the extent that further external motion indication for the purposes of this invention would be substantially superfluous. Furthermore, a continued flashing of the acceleration lights may have a deleterious effect on their recognition by other drivers, who thereby may become less sensitive to their illuminated state.

Accordingly, consistent with the intent of this invention which, in part, is to provide an early visible and conspicuous indication of vehicle motion, it is determined that the most effective indication of such motion is achieved by highly conspicuous lights that are illuminated in a unique manner only when necessary. This is provided by placing switch 100 and switch 108 in the position marked A. The acceleration lights will then only be illuminated in a unique display when the vehicle accelerator is depressed and the vehicle is in first gear.

Line 22 is thus provided from PCM 10 and is inverted in a conventional digital inverter 24, the output of the inverter being conditioned in a well-known manner by pulling it up through resistor 25. The conditioned signal is then input to a conventional two input NAND gate 20. The other input to the NAND gate 20 in this embodiment is line 18 from the PCM 10, which supplies a signal indicative of the state of the accelerator pedal (not shown) in the vehicle. If the pedal is depressed away from its rest position, the PCM 10 sets line 18 high, but if the pedal is substantially at its rest position, line 18 is kept low.

Accordingly, the combination of the two inputs to the NAND gate 20 provide the circuit of FIGS. 3 and 4 with information on transmission state and accelerator pedal position, which reliably indicate incipient vehicle motion. Either input alone would not provide such reliable information. For instance, when the transmission is not in first gear, a depressed throttle does not exclusively indicate incipient acceleration. The same is true when in first gear without accelerator depression.

The inventors recognize that other embodiments are within this invention for accurately predicting and displaying vehicle action, and it is not intended that the specific pedal inputs and the manner in which they are treated by the circuitry of this embodiment are the only means of carrying out this invention. Indeed, because this invention receives its control inputs directly from the vehicle controller, such as from the PCM 10 in this embodiment, it stands to benefit from the intelligence of the controller. For instance, it is within the scope of this invention that any information on prospective vehicle action, such as acceleration or braking, that the controller is privy to can be used in this invention to provide an external indication thereof.

Returning to the circuit of FIG. 3, the output of the NAND gate 20 will thus be high (pulled up through pull up resistor 32) when the accelerator is at its rest position or when the transmission is above first gear. Accordingly, with switch 100 in position A, the output of the inverting buffer 28 will be low, and the the output of inverting buffer 30 will be high, which corresponds to a high output impedance state, precluding any substantial current flow through relay 36 from the 12 volt supply. Thus, the switching portion of relay 36 will stay in its relaxed open state.

Alternatively, the output of NAND gate 20 will be low, the output of inverting buffer 28 high, and the output of inverting buffer 30 low when the accelerator is displaced from its rest position and the transmission is in first gear, indicating incipient vehicle motion. The flow of current from the 12 volt supply through the conventional relay 36 to the output of inverter 30, which should be selected so as to be capable of sinking significant current, will then close the relay switch, shorting line 38 to the twelve volt supply. The above-described circuitry selectively provides a source of power to constantly sequencing light control circuitry. The following circuitry is used to illuminate the acceleration lights in sequence when power is so provided.

A standard oscillator 50 is provided using two inverting buffers 52 and 54, a capacitor 56 and a resistor 58 in a well-known configuration. This oscillator provides a continuous clock signal to an eight stage counter 62. Ultimately, in this embodiment, four acceleration lights of the eight light sequence on each side of the vehicle are illuminated at any one time, with the four active lights shifting through the eight light sequence at the oscillator frequency. Accordingly, the oscillator frequency is selected so as to make the lights, when sequencing, highly conspicuous, consistent with the stated need for conspicuous lighting. To this end, the frequency of the oscillator 50 is selected in this embodiment as 14 Hz, which allows each stage of the lighting to stay on for approximately 270 milliseconds. Such a frequency is provided in a well-known manner by selecting capacitor 56 as 100 microfarads, and resistor 58 as 400 ohms.

The output of the oscillator 50 is conditioned for use by the counter 62 via inverting buffer 60, the buffer output being directed as the clock input into each stage of the standard eight stage ring counter 62. The counter 62 is comprised of eight D-type flip flops connected in a standard ring counter configuration, with each flip flop output Q being connected to the adjacent input D, and the output of the last flip flop 60h being wrapped around to the input of the first flip flop 60a. Thus, in a well-known manner, the data stored in each stage of the counter 62 is advanced from output stage to output stage and wraps around the counter at the oscillator frequency.

Each flip flop has both a set and a reset input for respectively storing a logic '1' and a logic '0' therein. Accordingly, a preset pattern of data may be stored in and sequenced through the counter by selectively setting and resetting the flip flops. Such is done with NAND gate 110, multivibrator 102, and associated circuitry, to be described. The output of NAND gate 20 feeds into the input of NAND gate 110. The second input of NAND gate 110 is, in this embodiment, grounded at position A via manual switch 108. Accordingly, the output of gate 110 will be held high in this embodiment, pulled up via five kilo-ohm resistor 112, relegating the set input of flip flops 60e-60h to the inactive state.

The multivibrator 102 may be a National Semiconductor CD4098, configured to output a pulse of short duration, such as 200 milliseconds, upon its input, connected to the output of gate 20, switching from high to low. The output of gate 20, as discussed, will switch from high to low when the vehicle transmission is shifted into first gear and the vehicle accelerator is depressed. Upon this transition, the multivibrator 102 outputs a pulse to inverter 104, causing an inverted pulse to be output from the inverter to the set input of flip flops 60a-60d and to the reset input of flip flops 60e-60h. The inverted pulse provides a short duration low signal to the flip flop inputs (which are active low), setting high the outputs of flip flops 60a-60d, and clearing the outputs of flip flops 60e-60h. After the short duration, the output of inverter 104 returns to the high state, deactivating the set and preset inputs of the flip flops.

The oscillator, as described, will then repeatedly rotate the stored pattern of four high outputs and four low outputs through the eight stage counter until the output of gate 20 is set high, such as when the accelerator is released or when the vehicle shifts out of first gear, as described.

Each output Q of the eight stages of the counter is connected to one of a set of eight relays 68a-68h that controls power to one of eight acceleration lights on each front cornering lamp of the vehicle, such as the left front cornering lamp 8 of FIG. 1. Specifically, each of the counter output lines connects to one of eight inverting buffers 66a through 66h, the output of which leads to one of eight conventional relays 68a through 68h. The side of the conducting portion of each relay opposite the inverters is shorted to line 38. As stated earlier for inverter 30, the inverters 66a-66h should be selected from a well-known class of inverters having high output impedance when the output is high, and having low output impedance capable of sinking significant current when the output is low.

Accordingly, the conducting portion of any of the eight relays 68a-68h will conduct substantial current only when line 38 is high, such as at 12 volts, due to relay 36 being closed, and when the inverter from the group 66a-66h has a low output. If either of these conditions are not met, none of the relays from the group 68a-68h will conduct. For instance, if line 38 is low, no relay will conduct. But even if line 38 is high, an individual relay will only conduct when its inverter from the group 66a-66h has a low output.

As stated earlier, line 38 will be high in this embodiment when the transmission is in first gear, and when the acceleration pedal is significantly displaced away from its rest position. Thus, the relays only can conduct when transmission and engine conditions indicate incipient motion. Furthermore, as earlier discussed, individual inverters from the group 66a-66h will have low outputs only when the counter 62 has high outputs. In summary then, there must be an indication of incipient motion for the relay to conduct, and they will conduct then in a pattern provided by the constantly stepping counter 62.

When any of the relays from the group 68a-68h conducts a significant amount of current through its conducting portion, a switching portion of the relay closes in a well-known manner. The switching portions of the eight relays 68a-68h are shown in FIG. 4 as 68a'-68h'. The switching portions 68a'-68h' are operative to control the supply of power to one of the lights in the acceleration light series, illustrated in FIG. 3 as subfigures 82 and 84. As earlier described, there are two such series of lights in this embodiment, one set 82 resident in the area of the front left cornering lamp 8 of the vehicle, and the other resident in the area of the front right cornering lamp of the vehicle (not shown).

Thus, the switching portions of the relays 68a'-68h' open and close in a pattern dictated by the output pattern of the counter 62 of FIG. 3, selectively illuminating pairs of acceleration lights 82 and 84. The power source 92, which is connected to both the eight relay switches 68a'-68h' and to the relay switch 14b used to selectively illuminate the supplemental brake lights 78 and 80, consists, in this embodiment, of a positive source of voltage, such as a twelve volt source connected to a well-known lamp driver 92, which varies its output dependent on a control input received from a photo cell 90.

The photo cell 90 is located on the vehicle so as to be privy to the level of ambient light, which it communicates as a control input to the driver 92. The driver varies the intensity of its output voltage in substantial proportion to the control input, from a maximum voltage of approximately 12 volts under bright ambient light conditions, to a minimum voltage, such as 8 volts in the dark. Thus, when vehicle lights need not be bright to be conspicuous, the circuit of FIG. 4 will decrease the intensity of the lights, saving power, extending lamp life, and reducing glare at night. When the acceleration lights 82 and 84 are not being sequentially illuminated to indicate prospective vehicle acceleration in accord with the above embodiment, they may be illuminated in a steady manner to improve vehicle conspicuity generally. Such is provided in a second embodiment of this invention by rotating switches 100 and 108 to the position marked B. In such a case, the sequentially illuminated acceleration lighting in accord with the first embodiment will be provided when acceleration is detected to be incipient, and the lights will be illuminated steadily otherwise.

Line 38 will be held high in the second embodiment, due to the input to inverter 28 being held low by switch 100. Therefore, any of the relays 68a-68h will conduct when the corresponding inverter from the group 66a-66h has a low output, which occurs when the corresponding stage of the counter has a high output. With switch 108 in position B, the output of NAND gate 110 will be low when the output of NAND gate 20 is high, which is provided when acceleration is not imminent, as discussed. The low output of NAND gate 110 activates the set input of flip flops 60e-60h. Furthermore, as the input to the multivibrator is high, its output stays low, and is inverted via inverter 104, deactivating the four set inputs to flip flops 60a-60d and the four reset inputs to flip flops 60e-60h. The output of flip flops 60e-60h will thus be set and held high, and the high output will be cycled through to the other four stages of the counter via the above-described counter sequencing action, until all counter stages have high outputs. At such time all relays will conduct, as described, lighting steadily all lights from the two sets 82 and 84.

Alternatively in this second embodiment, when acceleration is incipient, the acceleration lights will be sequentially illuminated in the manner described in the first embodiment. Specifically, the output of gate 20 will switch low, driving the output of gate 110 high and causing the multivibrator to output a single pulse which sets the output of flip flops 60e through 60h high, and clears the output of flip flops 60e-60h. The described action of the counter 62 and the oscillator 50 rotates this output pattern through the counter repetitively, sequentially illuminating the two sets of acceleration lights 82 and 84.

The foregoing description of a preferred embodiment for the purpose of explaining this invention is not to be taken as limiting or restricting the invention since many modifications may be made by the exercise of skill in the art without departing from the scope of the invention.

The embodiments of the invention in which an exclusive property or privilege is claimed are defined as follows:

1. An apparatus for indicating impending motion of an automotive vehicle, comprising:
   means for sensing a present active transmission gear;
   means for sensing impending vehicle acceleration, comprising (a) means for sensing when the present active transmission gear is a predetermined gear, and (b) means for sensing a driver acceleration command;
   means for illuminating an acceleration light upon sensing impending vehicle acceleration;
   means for extinguishing the acceleration light when the sensed active transmission gear is a gear other than the predetermined gear;
   means for sensing incipient vehicle braking;
   means for illuminating a vehicle brake light located at a predetermined position on the vehicle so as to be visible from the front of the vehicle and from at least one side of the vehicle, upon sensing incipient vehicle braking.

2. The apparatus of claim 1, wherein the accelerator light is comprised of a series of lights at predetermined positions on the vehicle so as to be visible from at least two sides of the vehicle, and wherein the means for illuminating the accelerator light further comprises means for sequentially illuminating and extinguishing constituent members of the series of lights.

3. A method for indicating impending motion of an automotive vehicle, comprising the steps of:
   sensing a present active transmission gear;
   sensing incipient vehicle acceleration, comprising the steps of (a) sensing when the present active transmission gear is first gear, and (b) sensing depression of a vehicle accelerator;
   sequentially illuminating and extinguishing constituent members of a plurality of lights at predetermined positions on the vehicle so as to be visible from at least two sides of the vehicle upon sensing incipient vehicle acceleration; and
   extinguishing the plurality of lights when the present active transmission gear is a gear other than first gear.

4. A method for indicating impending motion of an automotive vehicle, comprising the steps of:
   sensing a present active transmission gear;
   sensing incipient vehicle acceleration, comprising the steps of (a) sensing when the present active transmission gear is first gear, and (b) sensing depression of a vehicle accelerator;
   sequentially illuminating and extinguishing constituent members of a plurality of lights at predetermined positions on the vehicle so as to be visible from at least two sides of the vehicle upon sensing incipient vehicle acceleration; and
   constantly illuminating the plurality of lights when the present active transmission gear is a gear other than first gear.

* * * * *